UNITED STATES PATENT OFFICE.

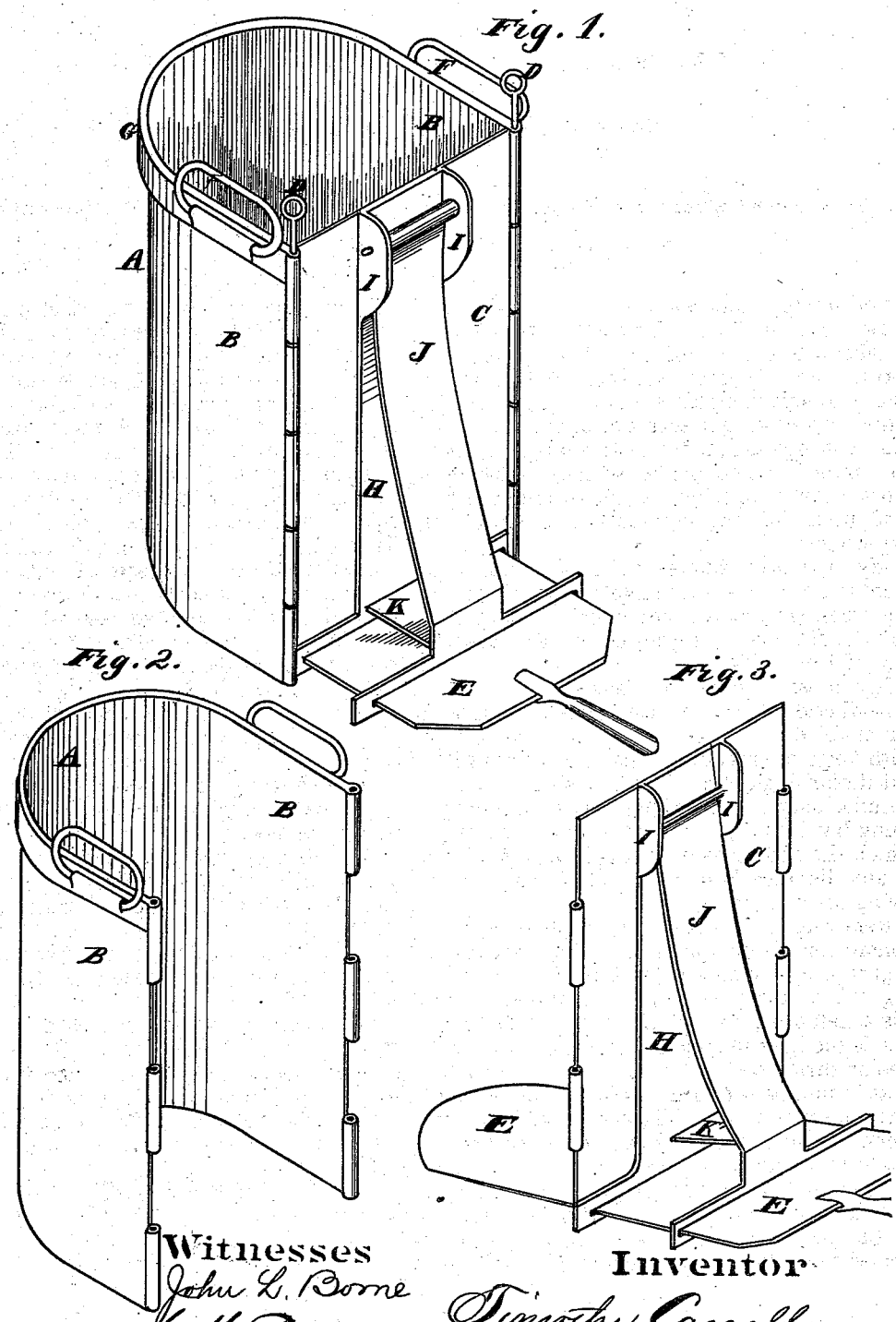

TIMOTHY CARROLL, OF ANAHEIM, CALIFORNIA.

IMPROVEMENT IN TRANSPLANTERS.

Specification forming part of Letters Patent No. 155,707, dated October 6, 1874; application filed September 10, 1874.

*To all whom it may concern:*

Be it known that I, TIMOTHY CARROLL, of Anaheim, Los Angeles county, State of California, have invented a Device for Removing and Transplanting Trees; and I do hereby declare the following description and accompanying drawings are sufficient to enable any person skilled in the art or science to which it most nearly appertains to make and use my said invention without further invention or experiment.

My invention relates to certain improvements in a device for transplanting or removing trees, shrubs, &c., for which Letters Patent No. 152,328 were granted to me on the 23d day of June, 1874.

My present invention consists in a novel construction of the inclosing-case, whereby I am enabled to employ it in removing plants with large or spreading tops or branches without disturbing them. The inclosing-case is of peculiar shape, and provided with a strengthening-band at the top, and the arm through which the slide passes is hinged, so as to stand at any distance from the side of the case, or swing up entirely out of the way.

Referring to the accompanying drawings for a more complete explanation of my invention, Figure 1 is a perspective view of my device. Fig. 2 is a view with the gate removed. Fig. 3 is a detached view of the gate and slide.

A is the inclosing-case, which surrounds the tree or shrub, and is driven into the ground so as to inclose the roots and a portion of their surrounding earth. This case I make of an arched form, as shown. The two sides B B of this arch are united by a straight door or gate, C, which extends across between these sides, and may be hinged in any suitable manner. In the present case I have shown sections formed to interlock, and the rods D are passed through like the pintles of a hinge. Either one or both of these rods may be removed, and the case can be passed around the body or stalk of the shrub, when the portion C can be replaced, and the rods D put back, so that the shrub will be inclosed. The shell can then be forced down, and the slide E at the bottom pushed in beneath the roots and inclosed earth, and the whole can be lifted by the handles F and carried to any desired point. The top of the shell A B B may be re-enforced by a stout metallic rim, G. A plate, H, extends down the middle of the gate C, and two lugs, I, are formed near the top, between which the arm J is hinged. This arm has a T-shaped extension at the bottom, and through a slot in this extension the slide E passes, as well as through a similar extension of the bottom of the plate H. These two plates guide the slide, and a projection, K, from the hinged arm J prevents it from shutting too closely against the side of the gate, which is thus adjustable out or in, as may be needed.

By taking out the pintle at the top, the arm J can be entirely removed after withdrawing the slide E, so that the case will take up but little room.

Having thus described my invention, what I claim, and desire to secure by Letters Patent, is—

In combination with the case A, with its gate C, plate H, and lugs I, the adjustable swinging brace and guide J with its stop K, the gate and guide being slotted to receive the slide E, substantially as herein described.

In witness whereof I hereunto set my hand and seal.

TIMOTHY CARROLL. [L. S.]

Witnesses:
 P. A. CLARK,
 H. S. AUSTIN, Jr.